(12) United States Patent
Anliker

(10) Patent No.: US 8,515,268 B2
(45) Date of Patent: Aug. 20, 2013

(54) BOILER FOR HEATING WATER IN COFFEE MACHINES

(75) Inventor: Markus Anliker, Granichen (CH)

(73) Assignee: Egro Coffee Systems AG, Niederrohrdorf (CH)

(*) Notice: Subject to any disclaimer, the term of this patent is extended or adjusted under 35 U.S.C. 154(b) by 548 days.

(21) Appl. No.: 12/682,021

(22) PCT Filed: Sep. 3, 2008

(86) PCT No.: PCT/CH2008/000369
§ 371 (c)(1),
(2), (4) Date: May 13, 2010

(87) PCT Pub. No.: WO2009/046550
PCT Pub. Date: Apr. 16, 2009

(65) Prior Publication Data
US 2010/0239236 A1    Sep. 23, 2010

(30) Foreign Application Priority Data
Oct. 8, 2007   (CH) .................................... 1557/07

(51) Int. Cl.
*H05B 3/40* (2006.01)
*A47J 31/40* (2006.01)

(52) U.S. Cl.
USPC ........... 392/497; 392/451; 392/448; 392/453; 99/282; 99/280; 99/281; 99/275; 99/323; 99/327

(58) Field of Classification Search
USPC ....... 99/282, 280–1, 275, 323, 327; 392/497, 392/451, 448, 453
See application file for complete search history.

(56) References Cited

U.S. PATENT DOCUMENTS
7,461,585 B2 * 12/2008 Nenov et al. .................... 99/282

FOREIGN PATENT DOCUMENTS
DE         25 52 625 A1     6/1977
WO         2008/098391 A1   8/2008

* cited by examiner

*Primary Examiner* — Shawntina Fuqua
(74) *Attorney, Agent, or Firm* — Sughrue Mion, PLLC

(57) ABSTRACT

The invention relates to a boiler for heating water in a coffee or espresso machine, comprising a boiler housing (1), a cold water inlet (7), a hot water outlet (8) and an electric heating device (5). Said boiler housing (1) is cylindrical and comprises a boiler cover (2), a boiler top (4) and a boiler base (3) having a cylinder axis (A) that is horizontal when in operation. The cold water inlet (7) and the hot water outlet (8) and the electric heating device (5) are mounted on the boiler base (3) of the boiler housing (1), that extends vertically, and the heating device (5) is configured in such a manner that each point inside the container volume is at a normal distance from the heating device (5) that is less than 40% of the container diameter (D).

12 Claims, 3 Drawing Sheets

BOILER FOR HEATING WATER IN COFFEE MACHINES

FIELD OF INVENTION

The present invention relates to a boiler for heating water in coffee machines, according to the preamble of claim 1.

BACKGROUND

Usually, such boilers are used in coffee and espresso machines, especially in machines for professional use. The boiler consists of a closed, compression-resistant, generally cylindrical container, with a cold water inlet and a hot water outlet, and a tubular heating body located inside the container and formed as a fixedly arranged heating spiral. Water present in the boiler is heated to the temperature required for brewing coffee and is subjected to a pressure of the order of about 10 bar. When a beverage is being prepared, hot water is taken from the boiler and at the same time an equal amount of cold water is made to inflow. In this manner, water temperature in the boiler decreases. The heater provided in the boiler provides for the quick heating of water, so that the coffee machine is again ready to operate in a short time, i.e. the subsequent beverage can be prepared. In machines for professional use it is expected that a new beverage can be prepared immediately after the completion of a beverage. Hence, the cycle time results from the phases of brewing and coffee preparation and coffee ejection of the coffee machine. The heating time should not lengthen such a cycle time. In order to achieve this, heating elements with an electric power as high as possible are used in the boilers. The drawback of the heating elements with high heating capacity is that the energy density at the heating body is very great and heat cannot at all be released sufficiently quickly from the heating element to the whole water mass. The coils of the tubular heating body are located close to each other so that they are mutually influenced, i.e. when heating the tubular heating body, heat is released not only to water but also to the immediately adjacent coils. This often results in local overheatings with generation of steam bubbles, and sometimes this can even be heard as a slight hiss. In the points where such local overheating occurs, due to the steam bubbles heat transfer between the tubular heating body and water is worse than in the absence of bubble generation, and this leads in the whole to a reduction in the efficiency of the heating apparatus.

CERTAIN OBJECTS OF INVENTION

It is an object of the present invention to provide a boiler for heating water in coffee machines, which overcomes the drawbacks mentioned above of the conventional devices.

The above object is achieved by a boiler having the features of claim 1.

BRIEF DESCRIPTION OF THE DRAWINGS

Further features and advantages of the present invention are explained with the aid of the following description of a preferred exemplary embodiment, in particular with reference to the accompanying drawings.

In the drawings.

DETAILED DESCRIPTION OF NON-LIMITING EMBODIMENTS

The principle of the boiler according to the invention is that, thanks to a suitably configured heating apparatus and to an insulated boiler housing, the required hot water amount is prepared in the same time with less electric energy than in conventional comparable coffee machines. The heating apparatus, preferably consisting of a tubular heating body, extends approximately over the whole volume of the boiler, so that heat is released to water over the whole volume as far as possible simultaneously and in uniformly distributed manner, and no local overheating with steam generation can occur. If it is envisaged to divide the overall volume in small individual cells, then each section of the tubular heating body has to simultaneously heat substantially the same number of cells directly surrounding the heating body or the same partial volume of the boiler, respectively. In this manner the time delay in water heating by convection for cells more remote from the heating body, as is the case in usual heating apparatuses, is strongly reduced. The coils of the tubular heating body are so arranged that they are no longer mutually influenced and, when heating the tubular heating body, heat is released substantially only to water.

Figure 1:
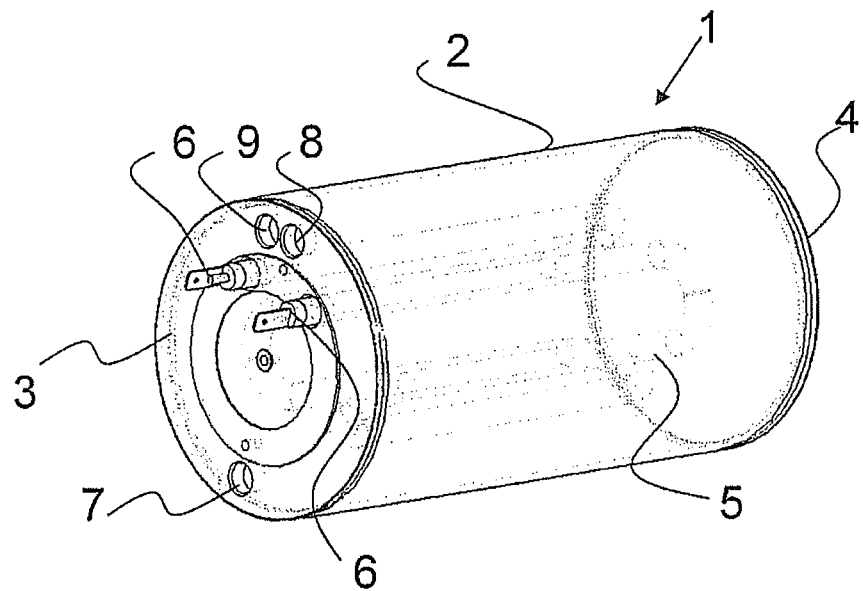
FIG. 1 is a perspective view of the boiler housing, with a transparent housing shell.

An exemplary embodiment of boiler 1 according to the invention is schematically shown in perspective view in FIG. 1. The cylindrical, compression-resistant boiler housing 1, made of stainless steel and having a capacity of about 1 to 2 liters, consists of a boiler shell 2 and of the side faces, welded with shell 2, which are arranged perpendicularly to the cylinder axis. Shell 2 is shown as being transparent, so that tubular heating body 5 can be seen inside boiler 1. One of the side faces of boiler housing 1 forms boiler cover 4, and the second side face forms boiler base 3 equipped with the passages for cold water connection 7, for hot water outlet 8 and for a temperature sensor 9, and with the electrical connectors 6 for tubular heating body 5. Boiler 1 is designed for a horizontal operation, i.e. the cylinder axis of a boiler 1 mounted in a coffee machine extends horizontally and boiler base 3 arranged perpendicularly to cylinder axis A extends vertically. Boiler base 3 is further directed so that cold water inlet duct 7 is located in its lower part, below the lowest loop of tubular heating body 5, and hot water outlet duct 8 is located in the upper part of boiler base 3, above connectors 6 for tubular heating body 5. Immediately beside the connection for hot water outlet duct 8 there is provided a passage 9 for a temperature sensor, which projects inside boiler housing 1 and is intended to measure and adjust water temperature.

Figure 2:
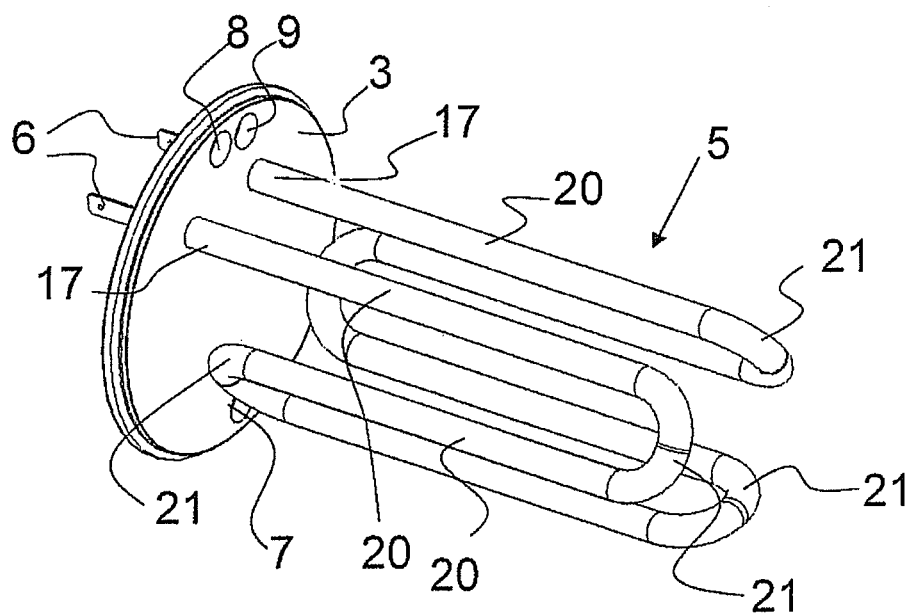
FIG. 2 is a perspective view of the boiler base with the heating apparatus seen from the inside.

FIG. 2 shows boiler base 3 with tubular heating body 5 assembled in perspective view. Tubular heating body 5 is configured so that each point inside the volume of the container is at most at a normal distance of 40% of diameter D of the container, preferably about ⅓ of diameter D of the container, from the tubular heating body. Tubular heating body 5 consists of six sections 20 extending parallel to cylinder axis A of boiler 1 at a distance d that preferably is about ⅓ of diameter D of the container. Each section has a length exceeding 75% of the longitudinal extension of the boiler housing and is at a normal distance d from the adjacent parallel section 20 that is also preferably about ⅓ of diameter D of the container. Even though distances d can range from 28% to 38% of diameter D of the container, preferably however they have a length of ⅓ of diameter D of the container. Tubular heating body 5 is fastened to vertically extending boiler base 3 so that the end sections 17 are arranged on top and extend parallel to cylinder axis A in boiler housing 1. Through such fastening, the electrical connections of heating body 5 are brought insulated to the outside to connectors 6. By construction, end sections 17 of tubular heating body 5 are not heated. Tubular heating body 5 is so configured that the respective ends of parallel sections 20, end sections 17 excepted, are followed by a half-circular curved portion 21, which is connected to the subsequent, parallel extending section 20 of tubular heating body 5.

Figure 3:
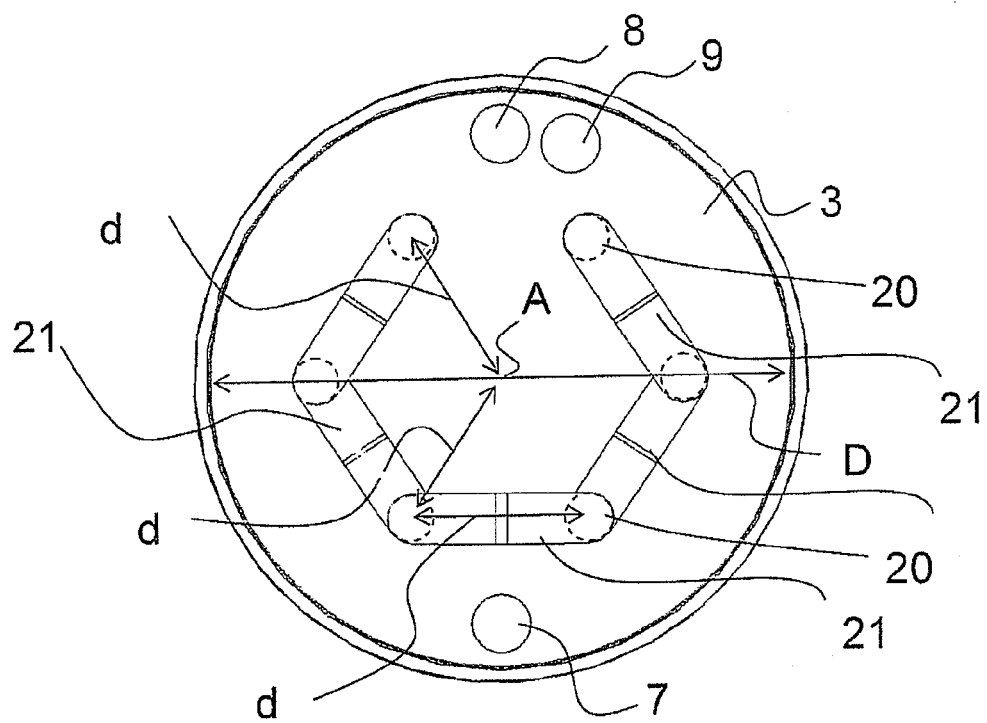
FIG. 3 shows the boiler base with the heating apparatus assembled, in a view taken in direction of the boiler axis.

Referring to FIG. 3, which shows boiler base 3 with tubular heating body 5 assembled, in a view taken in direction of boiler axis A, the geometrical arrangement of sections 20 extending parallel to boiler axis A and of the semicircular curved portions 21 can be seen. Each section 20 extending parallel to boiler axis A is at a normal distance d of one third of inner diameter D of boiler container 1 from both the adjacent parallel section 20 and axis A. Moreover, the openings for the passage of cold water connection 7 in the lowermost part of boiler base 3, and for hot water outlet 8 and temperature sensor 9 in the uppermost part of boiler base 3 above heater connectors 6 can be seen.

Figure 4:
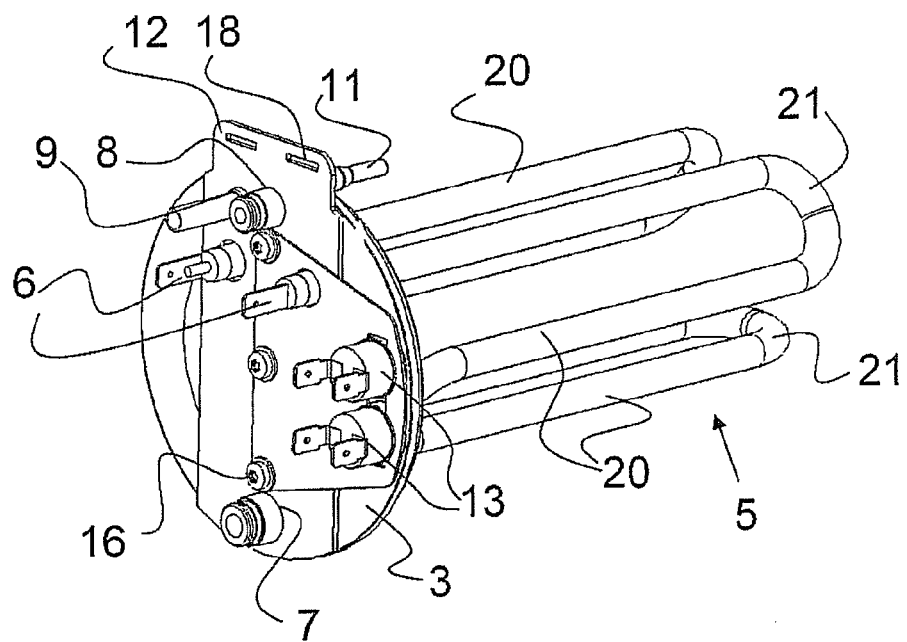
FIG. 4 is a perspective view of the boiler base with the heating apparatus seen from the outside.

Boiler base 3 with tubular heating body 5 assembled, is shown in perspective view seen from the outside in FIG. 4. The connections for passages 7 for cold water, for hot water outlet 8 and for temperature sensor 11 are pluggable and are held by a holding plate 12, which is secured to boiler base 3 by means of the screws 16. The principle of the pluggable connections is illustrated with reference to FIG. 5. Moreover, two safety switches 13 held by means of a holding plate 14 can be seen, which switches are electrically connected with the electric circuit of the heater and open that circuit in case of overheating of the boiler. Slots 18 in the upper part of holding plate 12 are provided for a suspended horizontal mounting of boiler 1 in a coffee machine.

Figure 5:
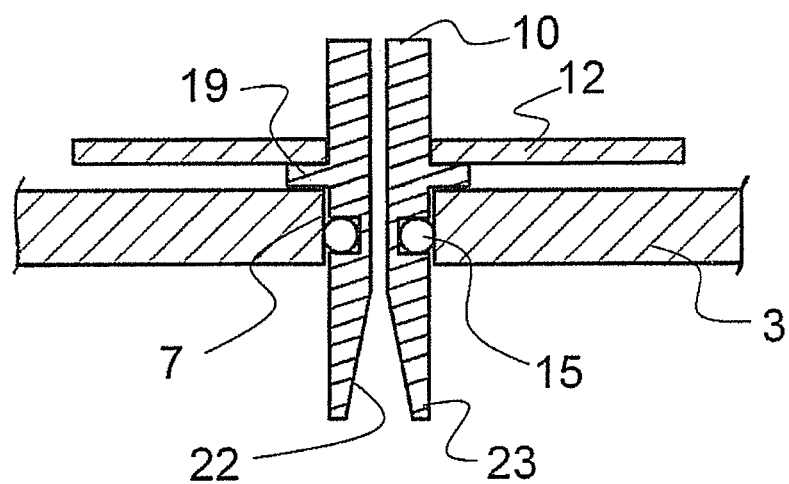
FIG. 5 is a schematic cross-sectional view through a pluggable water connection.

FIG. 5 is a schematic cross-sectional view through a pluggable water connection, which is pluggable in sealing manner into the passages of cold water inlet 7 and into the passage for hot water outlet 8 and is held by holding plate 12. Tubular connection 10 has an annular groove for receiving a sealing element 15, as well as a collar-shaped expansion 19 arranged above the annular groove. When connection 10 is inserted into boiler base 3, sealing element 15 is located inside passage 7, 8 and seals it. Collar-shaped expansion 19 serves as a stop and abuts upon the surface of boiler base 3. Holding plate 12 is inserted on connections 10 by means of corresponding holes, for instance shaped as keyholes, and is screwed with boiler base 3. In this manner, the connections are firmly and sealingly held in passages 7, 8, 9 without threads and they enable a simple assembling and disassembling in case of maintenance. The connection for temperature sensor 11 takes place in similar manner to the water connections. Appendage 23 of cold water connection 10 projecting inside boiler 1 has a conical widening 22 of its internal diameter near the end of appendage 23 for improving the inflow characteristics of the cold water being supplied. A cold-water or hot-water duct in form of a pipe or a flexible hose is connected in known manner to the outer end of connection 10.

The boiler shell and the side faces are sheathed with a thermally insulating layer in order to prevent as much as possible a heat release to the outside. Chromium steel is envisaged as the material for the boiler, whereby boiler shell 2 is welded with side walls 3, 4. However, also materials other than chromium steel, such as for instance plastics, can be envisaged for the boiler.

With boiler 1 according to the invention, the required amount of hot water for preparing beverages can be provided with less electric power than in conventional comparable coffee machines. Tubular heating body 5 extends approximately over the whole volume of boiler 1, so that heat is released to water uniformly distributed over the whole volume. When water is taken for preparing a beverage of about 200 ml, at the same time an equal amount of cold water is made to inflow and is heated until the preparation of the subsequent beverage to such a level that water has the required temperature also at the subsequent hot water taking. It has been seen that, in case twenty and more portions of water are taken immediately after one another for preparing a coffee beverage, the temperature of the water taken is constant and corresponds to the preset temperature. I.e. with the boiler according to the invention, with the amounts of water taken, no temperature oscillation occurs because of the switching on and off of the heating system, and the known effect of temperature hysteresis cannot be detected. In this manner, with the boiler according to the invention, the desired brewing temperature can be preset very precisely.

The invention claimed is:

1. A boiler for heating water in coffee and espresso machines, comprising a boiler housing, a cold water inlet and a hot water outlet, as well as an electrical heating device projecting inside the boiler housing, wherein the boiler housing has a cylindrical shape with a boiler shell, a boiler cover and a boiler base with a cylinder axis that is directed horizontally when in use, the cold water inlet duct and the hot water outlet and the electrical heating device are mounted on a vertically extending boiler base of the boiler housing, and the heating device is configured so that each point inside the volume of the boiler shell is at a normal distance from the heating device that is less than 40% of the diameter of the boiler shell.

2. The boiler as claimed in claim 1, wherein the heating device is made of a tubular heating body, which tubular heating body comprises six sections that extend parallel to the cylinder axis of the boiler and are at a normal distance of about one third of the internal diameter of the boiler shell from both the adjacent parallel sections and the axis, and in that each such section has a length that exceeds 70% of the longitudinal extension of the boiler housing.

3. The boiler as claimed in claim 1, wherein the tubular heating body is fastened to the boiler base so that the end sections are arranged on top and extend parallel to the cylinder axis in the boiler housing, and the electrical connection of the tubular heating body is brought insulated to the outside through such fastening.

4. The boiler as claimed in claim 1, wherein the cold water inlet duct is arranged in the lower part of the vertically extending boiler base and the hot water outlet is arranged in the upper part of the boiler base.

5. The boiler as claimed in claim 1, wherein a temperature sensor, projecting inside the boiler housing, is arranged on the boiler base in the region of the hot water outlet.

6. The boiler as claimed in claim 1, wherein the connections for the cold water and the hot water are pluggable.

7. The boiler as claimed in claim 5, wherein the temperature sensor is pluggable.

8. The boiler as claimed in claim 1, wherein at least one thermal protection switch is arranged on the boiler housing.

9. The boiler as claimed in claim 1, wherein the boiler housing is sheathed with a thermally insulating layer.

10. The boiler as claimed in claim 1, wherein the boiler housing is made of plastics.

11. A boiler for heating water in coffee and espresso machines, comprising:
- a boiler housing;
- a cold water inlet;
- a hot water outlet; and
- an electrical heating device comprising a tubular heating body with several sections projecting inside the boiler housing;
- the boiler housing comprises a boiler shell defining a generally cylindrical volume having a diameter and a cylinder axis, a boiler cover and a boiler base;
- the cold water inlet and the hot water outlet are located in the boiler base and the electrical heating device is mounted on the boiler base; and
- a distance d between each point inside the volume of the boiler shell and a closest surface of the tubular heating body is not greater than 40% of the diameter of the volume.

12. The boiler according to claim 11, configured to be mounted with the cylinder axis horizontally oriented when the boiler housing is in use.

* * * * *